(12) United States Patent
Luedtke et al.

(10) Patent No.: US 6,188,154 B1
(45) Date of Patent: Feb. 13, 2001

(54) ELECTRIC MOTOR WITH THERMAL SAFETY

(75) Inventors: Ulrich Luedtke, Karlsruhe-Durlach (DE); Fabrice Burg, Herrlisheim (FR); Hanno Camphausen, Albstadt (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/484,583

(22) Filed: Jan. 14, 2000

(30) Foreign Application Priority Data

Mar. 12, 1999 (DE) .............................................. 199 11 070

(51) Int. Cl.⁷ ................................................... H02K 11/00
(52) U.S. Cl. ........................ 310/68 C; 310/239; 310/248
(58) Field of Search ..................... 310/68 C, 66, 310/53, 173, 239, 248, 89, 40 MM; 290/38 C, 38 R; 337/401; 318/471

(56) References Cited

U.S. PATENT DOCUMENTS

| 3,707,694 | * | 12/1972 | DuRocher | 337/139 |
| 4,034,265 | * | 7/1977 | DuRocher et al. | 361/25 |
| 4,658,321 | * | 4/1987 | Lindner | 361/25 |
| 4,675,642 | * | 6/1987 | Reiferscheid | 337/140 |
| 5,089,735 | | 2/1992 | Sawaguchi et al. | 310/88 |
| 5,294,851 | * | 3/1994 | Tajima et al. | 310/68 C |
| 5,294,852 | * | 3/1994 | Straker | 310/68 C |
| 6,028,381 | * | 2/2000 | Yumiyama et al. | 310/68 C |
| 6,037,685 | * | 3/2000 | Berfield | 310/68 C |

FOREIGN PATENT DOCUMENTS

| 2352823A | * | 4/1975 | (DE) . |
| 2701884A | * | 7/1977 | (DE) . |
| 2754939A1 | * | 6/1978 | (DE) . |
| 0075138A | * | 3/1983 | (EP) . |
| 0 171 446 A1 | | 2/1986 | (EP) . |

* cited by examiner

Primary Examiner—Elvin Enad
Assistant Examiner—Joseph Waks
(74) Attorney, Agent, or Firm—Michael J. Striker

(57) ABSTRACT

An electric motor with a thermal safety feature has a rotor having a rotor winding, a brush for a current transmission to the rotor winding, a case which receives the brush, a switch-off contact which is arranged relative to the case so that it is contacted in response to a thermally caused position change of the case.

8 Claims, 1 Drawing Sheet

ELECTRIC MOTOR WITH THERMAL SAFETY

BACKGROUND OF THE INVENTION

The present invention relates to an electric motor which is provided with a thermal safety feature.

Electric motors of the above mentioned general type are known in the art. One of such electric motors is disclosed for example in U.S. Pat. No. 5,089,735. The known electric motor has a rotor with a rotor winding. The known rotor is provided with a brush for a current transmission from a stationary current terminal of the electric motor to a rotatably supported rotor winding. The brush is received movably in a case and is spring-loaded against a collector of the rotor. The known electric motor is also a collector motor. The present invention is however not limited to collector motors, but instead can be used for example for sliding ring motors or in general for electric motors in which a current transmission is performed to the rotor winding through a brush or a similar sliding body.

In order to provide the protection from thermal overloading, the known electric motors have a thermal safety means. The thermal safety means include a bimetal-interruption contact which is arranged closely on the brush of the electric motor. During heating of the brush and thereby the bimetal-interruption contact, the bimetal interruption contact opens by a switch-off temperature. Thereby the current supply to the rotor winding is interrupted, and a further thermal heating of the electric motor is prevented.

Another electric motor provided with a thermal safety feature is disclosed for example in the European patent document EP-A 171 446. This electric motor has metal spring tongs composed of a shape memory elements, on which the brushes of the electric motor are mounted. The spring tongs press the brushes against a collector of the electric motor. The shape memory elements change their shape abruptly during exceeding of a threshold temperature. The spring tongs composed of the shape memory elements in the known electric motors are shaped and arranged so that in the event of exceeding the threshold temperature, the brushes are lifted from the collector and thereby the current supply to the rotor winding is interrupted.

SUMMARY OF THE INVENTION

Accordingly, it is an object of the present invention to provide an electric motor of the above mentioned general type, which avoids the disadvantages of the prior art.

In keeping with these objects and with others which will become apparent hereinafter, one feature of present invention resides, briefly stated, in an electric motor which has a switch-off contact which is arranged relative to a case so that it is contacted during a thermally-caused length change of the case.

The thermally dependent position change can be a temperature expansion of the case. Also, it is possible that the case is connected with a synthetic plastic part which in response to an undesirably intense heating softens and melts so that the position of the case changes.

The switch-off contact is connected to ground, so that a short circuiting is released when the case supplied with a potential comes in contact with the switch-off contact due to the thermally caused position change. Thereby a melting safety element is burnt through and a current supply to the electric motor is interrupted.

It is possible to lift the case from a counter contact by the thermally caused change of the switch-off contact, and thereby to interrupt the current supply to the electric motor.

The contacting of the switch-off contact can be reversible. Thereby the electric motor after cooling can return back to operation. On the other hand, in the invention the contacting or decontacting of the switch-off contact can be irreversible. Thereby the electric motor can not be brought back into operation after a thermal overloading.

The present invention has the advantage that it provides for a simple and price-favorable thermal safety of the electric motor. The switchoff contact can be formed for example as a tong which is formed of one piece with a housing part of the electric motor and produced by punching. In the predetermined position it is bent relative to the case. Thereby no additional parts or additional working steps are needed during assembly of the electric motor, and the manufacture is not more expensive than the manufacture of an electric motor without the inventive thermal safety feature. The thermal safety is released during a thermal overloading of the electric motor in a reliable manner, and there is no danger of burning.

The inventive electric motor is provided for operation of a secondary air pump (impeller), for oxidation of exhaust gasses of an internal combustion engine. In order to oxidate non-burnt or incompletely burnt hydrocarbons and carbon monoxide secondary air is supplied to hot exhaust gasses of internal combustion engines with such a secondary air pump. The secondary air can be supplied in the internal combustion engines both with and without a catalyst.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
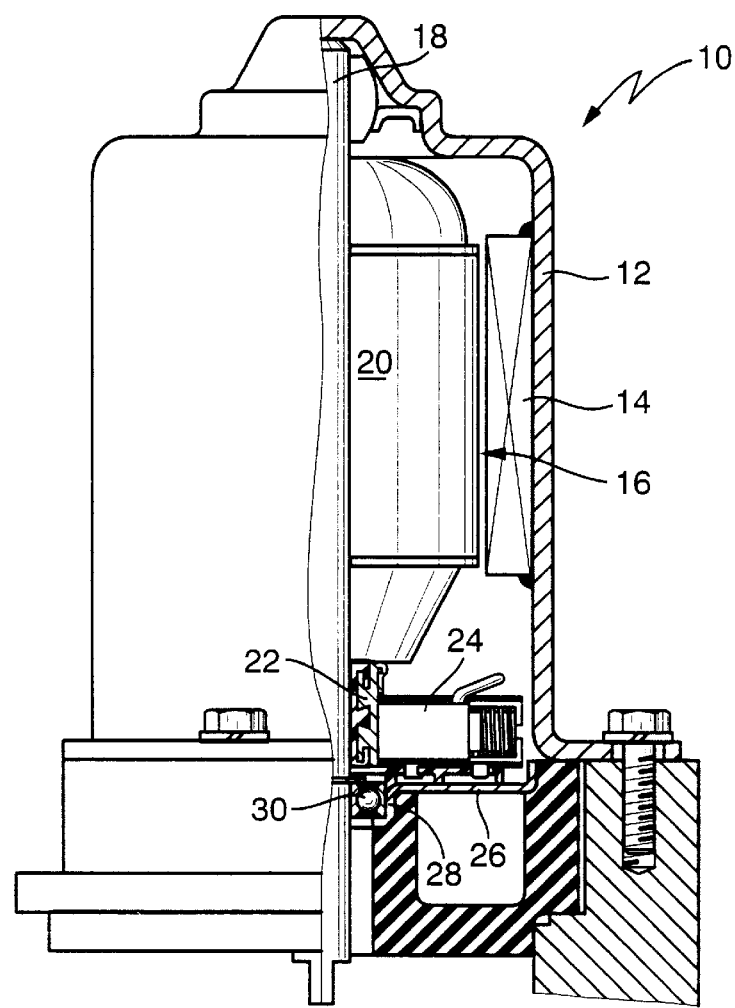
FIG. 1 is a view which schematically shows an electric motor in a half section, in accordance with the present invention.

An electric motor as shown in FIG. 1 is identified as a whole with reference numeral 10. The electric motor has a cup-shaped housing 12 which is produced by deep-drawing of a metal sheet. Permanent magnets 14 are arranged on an inner side of the housing and form a stator.

A rotor 16 with a motor shaft 18 and a rotor winding 20 is rotatably supported in the motor housing 12. The motor shaft 18 carries a collector (commutator) 22. Spring-loaded carbon brushes 24 abut against the periphery of the collector 22. A bearing block 26 is arranged on an inner side. The bearing block 26 is a disk-shaped part which is produced by punching and deep-drawing of a metal sheet. It closes an open end side of the cup-shaped motor housing 12. The bearing shield 26 is a part of the motor housing. Together with the motor housing 12 it is connected to a ground potential. A ball bearing 30 is pressed in a hollow cylindrical depression 28 of the bearing shield 26. It is rotatably connected with the motor shaft 18 in the bearing shield 26.

Figure 2:
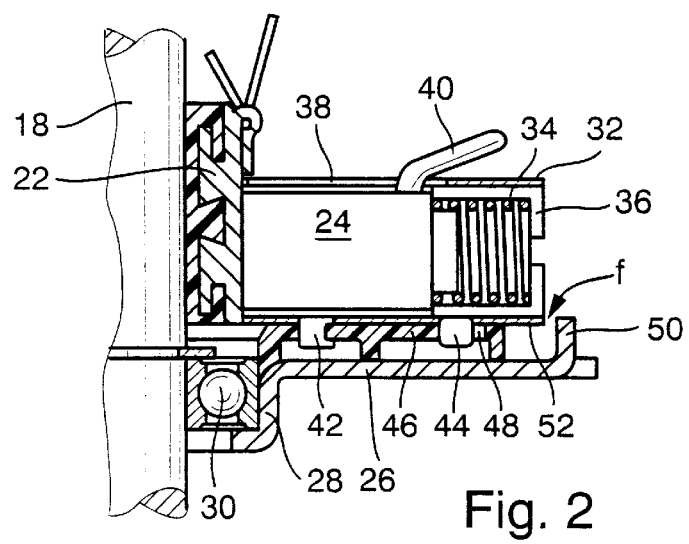
FIG. 2 is a view showing a collector arrangement of the electric motor of FIG. 1 on an enlarged scale.

The region of the collector 22 and the carbon brushes 24 is shown in FIG. 2 on an enlarged scale and can be clearly understood from it. The carbon brushes 24 of the electric motor 10, as shown in FIG. 2, are displaceably supported in a case 32. The case 32 is produced from a metal sheet. It has a rectangular cross-section such as the carbon brushes 24. The case 32 is arranged radially to the motor shaft 18. The brushes 24 are displaceable radially to the motor shaft 18. A helical pressure spring is arranged as a brush spring 34 in the case 32. It abuts against inwardly bent metal plate tongs 26 of the case 32. The carbon brushes 24 are pressed in a springy manner against the collector 22. A side wall of the case 32 is provided with a slot 38 which extends radially to the motor shaft 18. A brush cable 40 passes through the slot 38 and is mounted on the carbon brush 24. A current supply is provided through the brush cable 40 via the carbon brushes 24 and the collector 22 to the rotor winding 20 which is not shown in FIG. 2.

The case 32 is provided with two tong pairs 42, 44 on its side wall. The case 32 is mounted with the tong pairs on a brush holder 46 which is produced by injection molding from a thermal plastic. The brush holder 46 is mounted on an inner side of the bearing shield 26. It electrically insulates the case 32 on the inner side of the bearing shield 26. The brush holder 46 has two slot pairs 48 through which the tong pairs 42, 44 of the case 32 pass. The tong pairs 42, 44 are bent away from one another at the side of the brush carrier 46 which faces away from the case 32. Thereby the tong pairs engage the brush holder 46 and hold the case 32 on the brush holder 56.

The slot pair of the brush carrier 46, through which the motor shaft 18 passes near the tong pair 42 of the case 32, has a length which corresponds to a width of this tong pair 42. This slot pair is thereby coextensive with the tong pair 42 and not visible in the drawings. The tong pair 42 located near the motor shaft 18 is non displaceable in the slot pair through which it extends. It forms a fixed bearing 42 of the case 32.

Another tong pair 44 of the case 32 which is remote from the motor shaft 18, passes through the slot of the slot pair 48. It has a greater length than that corresponding to a width of the tong pair 44. The tong pair 44 of the case 32 which is remote from the motor shaft 18 is thereby displaceable radially from the motor shaft 18. It forms a releasable bearing 44 of the case 32.

A tong which forms a switch-off contact 50 is bent inwardly on the bearing shield 26. The switch-off contact 50 is located at a distance from the case 32 at the side which faces away from the motor shaft 18. The switch-off contact 50 overlaps an outer edge 52 of the case 32. A gap between the switch-off contact 50 and the outer edge 52 is seen in FIG. 2 and identified with arrow F.

A brush arrangement shown in FIG. 2 has a thermal safety element 4 for the electric motor 10. When the electric motor is thermally overloaded due to an excessively high or excessively long current, its carbon brush 24 is heated. The carbon brush 24 heats the case 32 with the tong pairs 42, 44. The case 32 and the tong pair 42, 44 deviate from the brush holder 46 which is composed of a thermoplast so that the force of the brush spring 44 displaces the case 32 outwardly radially from the motor shaft 18. During the displacement, the tong pair 42 of the deviating brush holder 46 near the motor shaft 18 which is formed in a fixed bearing is deformed, and the tong pair 44 which forms a releasable bearing is displaceable. The outer edge 52 of the case 32 is in contact with the switch-off contact 50. While the switch-off contact 50 which is of one piece with the bearing shield 26 is connected to ground similarly to the bearing shield 26 and the total motor housing 12, the case 32 has an electrical potential which is different from the ground through the brush cable 40 and the brush 24. The contacting of the case 32 with the switch-off contact 50 provides a short circuiting, with which a not shown melting safety element is burnt through and thereby the current supply of the electric motor is interrupted.

The short circuiting is irreversible, and the electric motor can not be brought back into operation. The softening temperature of the brush holder 46 is selected so that the brush holder 46 is softened by a brush temperature, at which no inflamation temperature in the electric motor 10 takes place and also no burning danger is generated. It abuts for example against the motor shaft 18 near the tong pair 42, since the brush 46 at the abutting against the collector 22 is heated more than at a distance from the collector 22. For example, the softening temperature of the burst carrier 46 is reached, when a brush temperature is increased to approximately 320–360° C.

It will be understood that each of the elements described above, or two or more together, may also find a useful application in other types of constructions differing from the types described above.

While the invention has been illustrated and described as embodied in electric motor with thermal safety, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An electric motor with a thermal safety feature, comprising a rotor having a rotor winding; a brush for a current transmission to said rotor winding; a case which receives said brush; a switch-off contact which is arranged relative to said case so that it is contacted in response to a thermally caused position change of said case.

2. An electric motor as defined in claim 1; and further comprising a housing part, said housing part being provided with said switch off contact.

3. An electric motor as defined in claim 1, wherein said case is electrically conductive.

4. An electric motor as defined in claim 1; and further comprising a housing, said case with said brush holder being mounted on said housing and composed of a synthetic plastic material with a softening temperature located below an inflammation temperature of the electric motor.

5. An electric motor as defined in claim 4, wherein said case is provided with a fixed bearing and a releasable bearing, with which it is mounted on said brush holder.

6. An electric motor as defined in claim 5; and further comprising a motor shaft, said fixed bearing being located near said motor shaft, while said releasable bearing being located far from said motor shaft.

7. An electric motor as defined in claim 1; and further comprising a motor shaft, said switch-off contact being located in a region of an end of said case which is far from said motor shaft.

8. An electric motor as defined in claim 7, wherein said switch-off contact is arranged radially outside of said case with respect to said motor shaft.

* * * * *